(12) United States Patent
Chou et al.

(10) Patent No.: US 6,917,577 B2
(45) Date of Patent: Jul. 12, 2005

(54) METHOD FOR DETERMINING POSITION OF OPTIC PICK-UP HEAD AND DEVICE OF THE SAME

(75) Inventors: Sue-Hong Chou, Taipei (TW); Yi-Lin Lai, Keelung (TW)

(73) Assignee: Via Technologies, Inc. (TW)

( * ) Notice: Subject to any disclaimer, the term of this patent is extended or adjusted under 35 U.S.C. 154(b) by 482 days.

(21) Appl. No.: 09/974,952

(22) Filed: Oct. 10, 2001

(65) Prior Publication Data

US 2002/0064115 A1 May 30, 2002

(30) Foreign Application Priority Data

Nov. 30, 2000 (CN) .......................................... 89125406

(51) Int. Cl.$^7$ ................................................ G11B 7/00
(52) U.S. Cl. .................. 369/239; 369/53.29; 369/60.01
(58) Field of Search ............................. 369/239, 53.29, 369/60.01

(56) References Cited

U.S. PATENT DOCUMENTS

| | | | | | |
|---|---|---|---|---|---|
| 3,593,333 A | * | 7/1971 | Oswald | .................. | 360/77.08 |
| 4,155,105 A | * | 5/1979 | Braun | .......................... | 360/51 |
| 4,254,500 A | * | 3/1981 | Brookhart | ..................... | 386/87 |
| 4,439,849 A | * | 3/1984 | Nabeshima | .............. | 369/47.46 |
| 5,270,991 A | * | 12/1993 | Verboom | ................. | 369/44.26 |
| 5,298,812 A | * | 3/1994 | Bigge | ......................... | 327/102 |
| 5,590,105 A | * | 12/1996 | Enami et al. | ............ | 369/47.42 |
| 5,796,540 A | * | 8/1998 | Jones et al. | ............. | 360/73.02 |
| 6,137,757 A | * | 10/2000 | Kinoshita | ................. | 369/47.41 |
| 6,560,302 B1 | * | 5/2003 | Shim et al. | ................. | 375/354 |
| 6,727,956 B2 | * | 4/2004 | Suzuki et al. | ............... | 348/524 |

* cited by examiner

Primary Examiner—Gautam R. Patel

(57) ABSTRACT

A method for determining the position of an optic pick-up head and the device of the same are disclosed. The number of frames in certain section of the disk are used to determine the position of the optic pick-up head. The number of frames in inner section of the compact disk is smaller than that in the outer section. The disk is virtually divided into a plurality of sections, and number of frames within each section is defined. As a result, when the optic pick-up head is at a certain frame, the position of the optic pick-up head can be determined the number of frames in the section.

1 Claim, 7 Drawing Sheets

METHOD FOR DETERMINING POSITION OF OPTIC PICK-UP HEAD AND DEVICE OF THE SAME

FIELD OF THE INVENTION

The present invention relates to a method for determining the position of an optic pick-up head and the device of the same, wherein a disk is corresponding to a plurality of frames for determining the position of the optic pick-up head relative to a compact disk.

BACKGROUND OF THE INVENTION

Since the progresses in the electric and electronic technologies, more and more products are developed for improving the human life and are used widely.

The developments of computers and calculators have induced a large variation to the human life. Not only many works can be performed rapidly, but also the data storage, input, output and others can be executed through a computer so that the working time is reduced greatly. Further, in the multi-media, by the playing through an optic disk drive, a preferred audio and video effects are present to the audiences.

In the electronic technology, audio and video signals are digitally stored in a compact disk for many years. However, in the processing technology, there are many defects necessary to be improved. There are many different compact disks having different storing formats. In the current popular digital versatile disk (DVD), many data storage formats are used, including a single layer single surface format, a single layer double surface format, a double layer single surface format, a double layer double surfaces format, etc. In the data storage, large amount of data and signals can be stored through digitally signal processing.

Referring to FIG. 1, a data section 2 in a general compact disk 1 is disclosed. In FIG. 1, a minor data storing section 200 is made on the data section 2 of the compact disk 1. This data storing section 200 is stored with data of various formats.

There are various modes in the compact disks for storing data. In the reading of data, in order to increase the reading speed, the rotary speed of the compact disk is increased mechanically. However, this mechanic way for speeding the reading of data is limited. For the current designed compact disks, since a high rotation speed will induce a large sound due to interaction with air, and moreover, the stability of the reading data is deteriorated so that faults occur in reading data. Therefore, to increase the rotary speed of an optic disk drive for speeding the reading of a data cannot solve all rotated.

Besides, in the prior art, the compact disk is rotated with a constant angular velocity (CAV). While as the data of a compact disk is read, the optic pick-up head is moved with constant linear velocity (CLV) for reading data on outer tracks of a compact disk. Further data on inner tracks is also read in CAV mode. But in reading data on inner tracks, since the frequency of a phase lock loop (PLL) is limited, when the optic pick-up head moves from outer track into inner track, the frequency is increased. If the CAV mode is converted into a CLV mode in an improper timing, it is possible that the phase lock loop cannot be operated normally. Therefore, in determining the switching timing of the CAV and CLV, the position of the optic pick-up head must be decided precisely for preventing fault.

SUMMARY OF THE INVENTION

Accordingly, the primary object of the present invention is to provide a method for determining the position of an optic pick-up head and the device of the same, wherein a rapid and correct position determining is provided.

Another object of the present invention is to provide a method for determining the position of an optic pick-up head and the device of the same, to rapidly determine the position of an optic pick-up head.

To achieve the object, the present invention provides a method for determining the position of an optic pick-up head and the device of the same. The number of data stored in each track of the compact disk is used to determine the position of the optic pick-up head. In general, the press of a compact disk is executed with a constant linear speed. Therefore, the number of frame in inner track of the compact disk is smaller than that in outer track, while the number of the data is positive proportional to the distance to a center of the optic pick-up head. Thereby, each compact disk is virtually divided into a plurality of sections, and number of frames per section is defined. As a result, when the optic pick-up head is at a certain section, the position of the optic pick-up head can be determined from the number of frame in the section.

The method for determining the position of an optic pick-up head (PUH) relative to a disk with a plurality of sections, each section corresponding to an upper limit and a lower limit, comprises the steps of: (1) reading sync signals on the disk; (2) generating an averaged sync signal in certain rotations of the disk; (3) comparing the averaged sync signal with the upper limit and the lower limit to determine a current section where the pick-up head is located; (4) generating a PUH ready signal indicating the PUH in a steady state, based on a frequency variation signal, a track on success signal and the rotation frequency of the disk. The step of (2) generating the averaged sync signal includes: (a) determining a rotation frequency of the disk based on the moving speed of the PUH and the distance between the PUH and a center of the disk; and (c) calculating sync signals in certain rotations of the disk. Further, by the virtual division of the frame of a compact disk provided in the present invention and the division of the frame, the data can be read rapidly and the position of the optic pick-up head can be searched rapidly.

In the device for an optic pick-up head to search for a position of the present invention, the device comprises: a position detector for receiving and processing a signal of a frequency variation (FA), a track on success signal (TOS), and a frequency of disk rotation signal (FODR) and outputting a pick-up head ready signal (PUHRDY); and a position condition detecting unit for receiving a frame synchronous signal (FRAMESYNC) and a disk rotating frequency signal (FODR), and outputting an optic pick-up head position signal; wherein the effectiveness of the optic pick-up head position refers to a condition of the pick-up head ready signal.

Preferably, the position condition detecting unit further comprises: a counting unit for receiving the FRAMESYNC signal and the FODR signal and outputting a FRAMESYNC per FODR; a position counting unit, receiving the feedback position signal, and outputting an upper limit and a lower limit of current section; a comparing unit, receiving the FRAMESYNC per FODR, the upper limit and lower limit of the current section and outputting the optic pick-up head position signal.

The various objects and advantages of the present invention will be more readily understood from the following

DETAILED DESCRIPTION OF THE PREFERRED EMBODIMENTS

Figure 1:
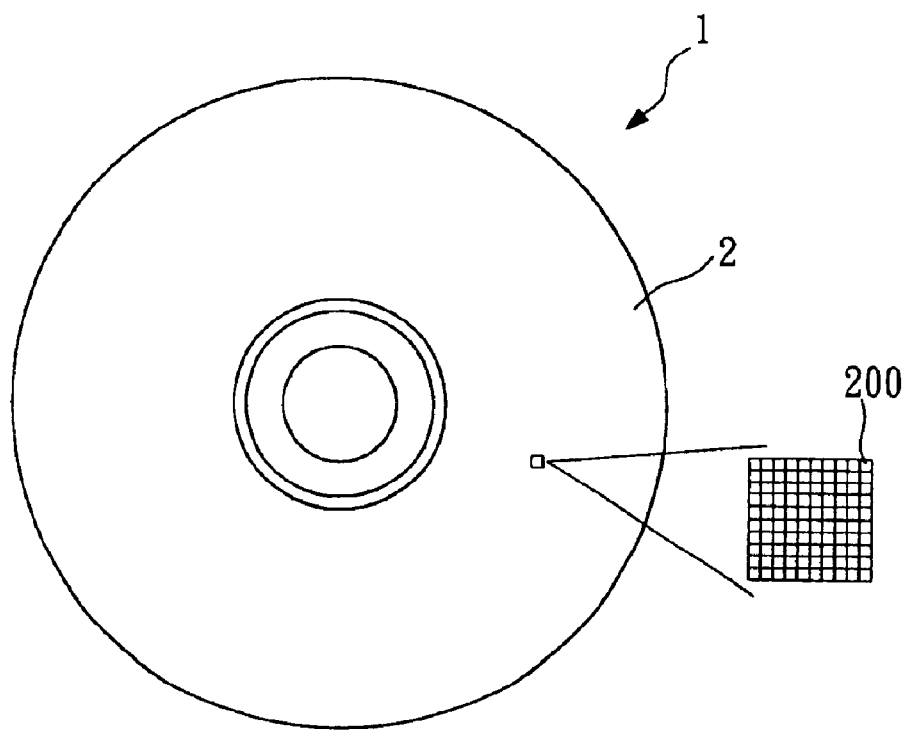
FIG. 1 is a front schematic view of a prior art compact disk.
Figure 2:
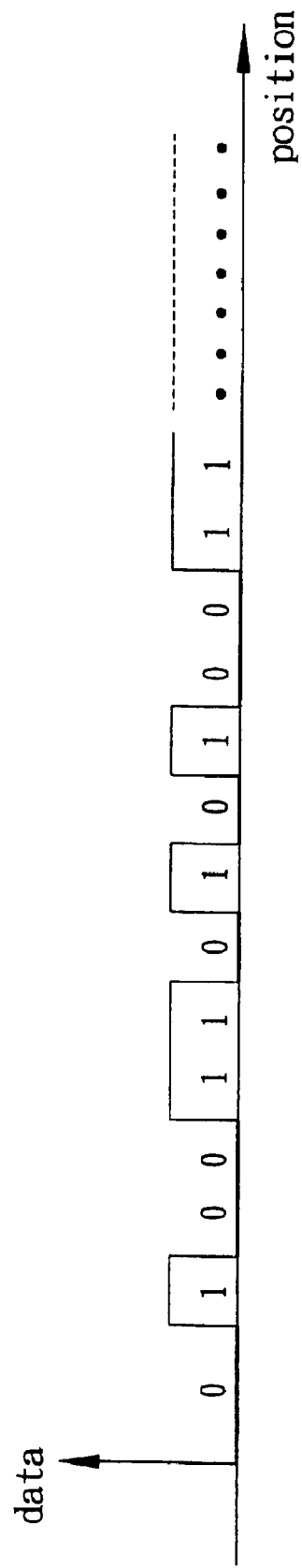
FIG. 2 is a schematic view showing the data signal of a compact disk in the present invention.

Referring to FIG. 2, a structure schematic view of data signal is illustrated. The data signal has a form of a square wave. Therefore, in the data storage system, as an optic disk drive reads data, the data recorded on the compact disk must be digital. However, in the practical application, data is generated as analog data. Thus, in processing, the analog signal must be converted into digital signal. In the general compact disks, a data slicer is used to generate digital signal. Then, the analog signal is compared with the slice level. If the analog signal is larger than the slice level, then the digital signal is 1 (high level). On the contrary, the digital signal is 0 (low level). Thus, signal with a high level or a low level is a digital signal.

By a digitized process, the desired message is stored in 0 or 1. With the variation of positions, different signal structure is generated. Thus this signal is stored in the recording section in a compact disk and therefore, it is appreciated that the data signal has a predetermined length which is unchanged with the variation of position. That is, the structure of a digital signal is determined according to the frequency of the sampling as modulating an analog/digital signal. The length of the data stored in a compact disk is fixed in a compact disk. Therefore, the length of unit data in each position on the compact disk is fixed, which is not varied with the distance to the center.

In the method for determining a position of an optic pick-up head according to the present invention, a virtual division for disk is performed. In reading data in the compact disk, the optic pick-up head in an optic disk drive is used to scan data in the recording section. Therefore, the compact disk is divided properly into several frames so that the optic pick-up head may search data steadily and rapidly and thus, reading of the optic pick-up head can be performed rapidly.

Figure 3A:
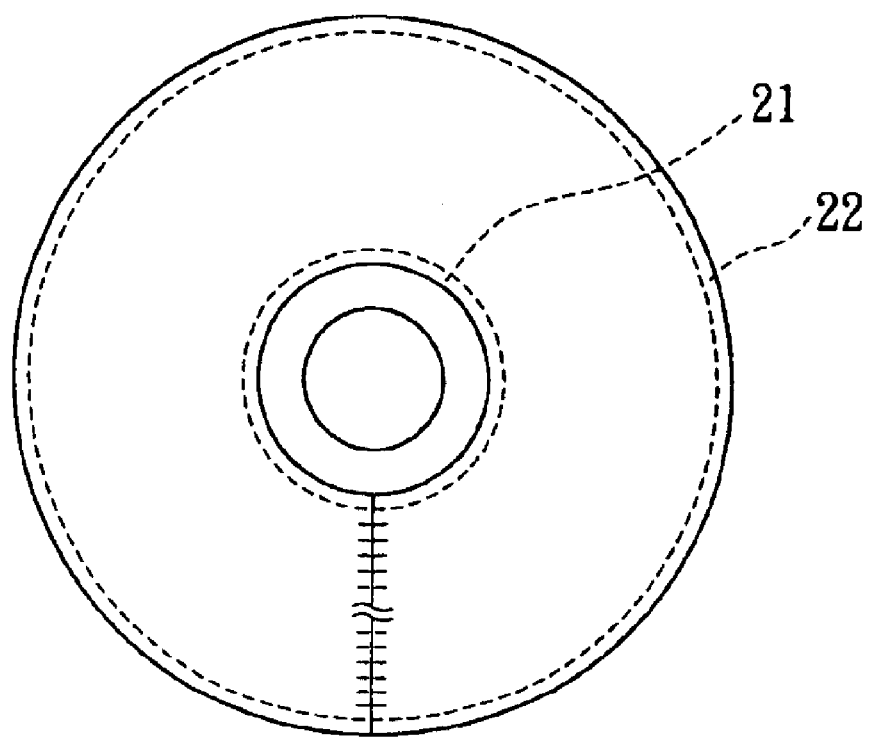
FIG. 3A is a schematic view showing the virtual section of the compact disk.

With reference to FIG. 3A, a schematic view for virtually dividing a compact disk into sections in the present invention is illustrated. In the present invention, through a properly virtual division, in data reading at a steady condition, the position of the optic pick-up head is searched rapidly. Furthermore, the processing time in the succeeding reading can be executed quickly. With reference to FIG. 3A, in the present invention, a compact disk is virtually and rapidly divided into 16 section, for example, in the innermost is a first section 21, and in the outermost cycle is a sixteenth section 22, while in the physical structure of a compact disk, this division is not existed. Each section includes a plurality of frames. Each frame has 588 bits (in CD), or 1488 bits (in DVD). A frame synchronous signal (FRAMESYNC) is located between two frames. In reading data from a disk, as a FRAMESYNC is detected, it represents beginning of a frame. Then, the number of frames for a section is known from the number of cycles in scanning the section and number of the FRAMESYNCs per cycle. Another, the number of frames through one cycle of the compact disk can be acquired from the number of the detected FRAMESYNC.

Figure 3B:
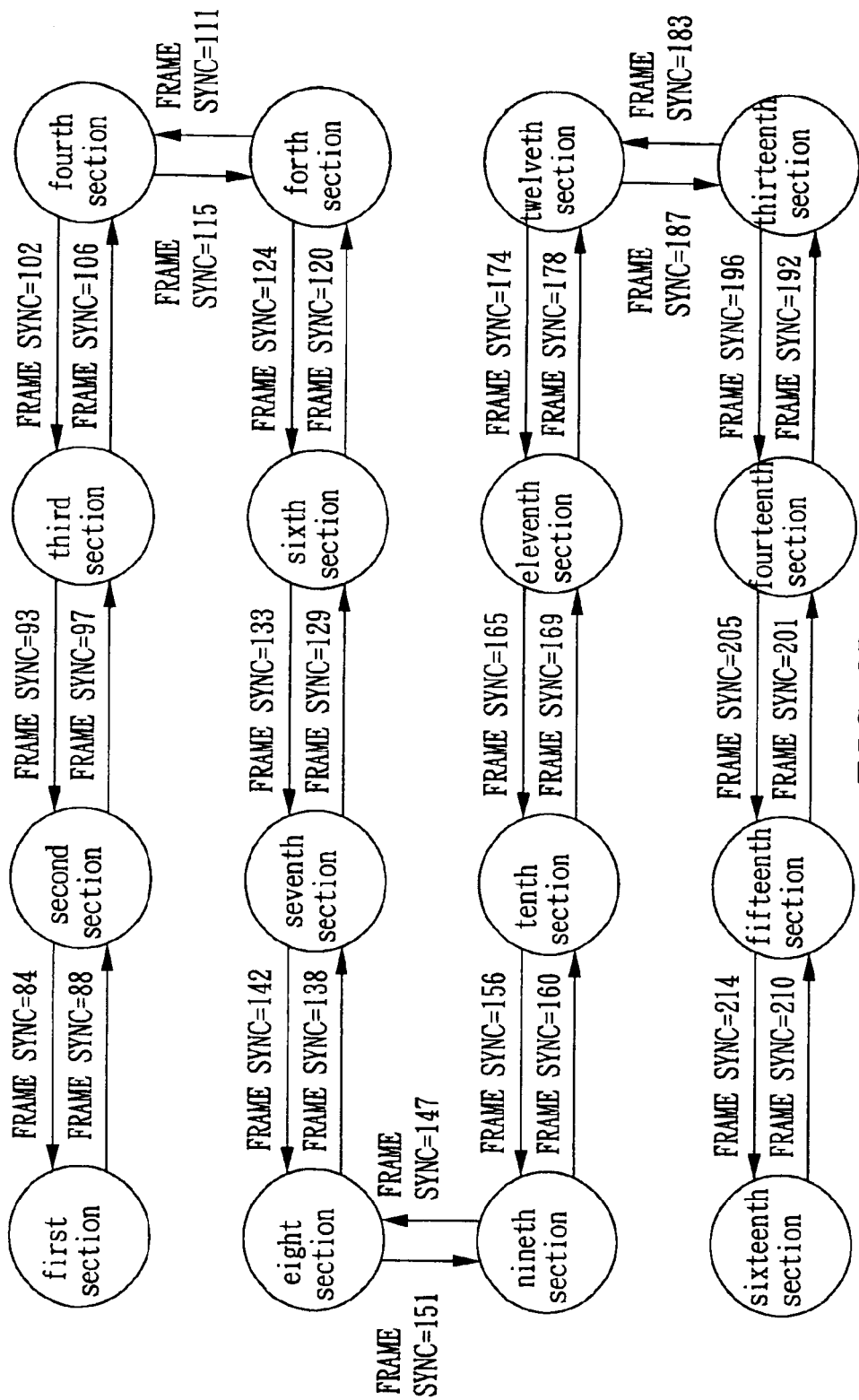
FIG. 3B is a schematic view showing the setting of the virtual sections in the present invention.

With reference to FIG. 3B, a schematic view showing a virtual division of a compact disk according to the present invention is illustrated. In the embodiment illustrated in FIG. 3B, the compact disk is virtually divided into 16 sections. The first section includes 84 to 88 FRAMESYNC signals; the second section includes 88 to 97 signals and so on. Smith trigger is used for avoiding the jitter of the optic pick-up head between various sections. For example, the determination of the position of the optic pick-up head does not leave from the first section into the second section until 88 FRAMESYNC signals are detected in one rotator of disk. If the number of FRAMESYNC signals is reduced to 87, then to the position is not changed as the first section only if the number of FRAMESYNC is reduced to 84. The function for determining the division of the frames is: FODR constant× $(2\pi \times R/B) \times 7350$, where FODR (frequency of disk rotation) is the rotation frequency of the disk; R represents the radius of the concentric cycle at the position of the optic pick-up head; and B is the rotating or moving speed of the optic pick-up head.

Figure 4A:
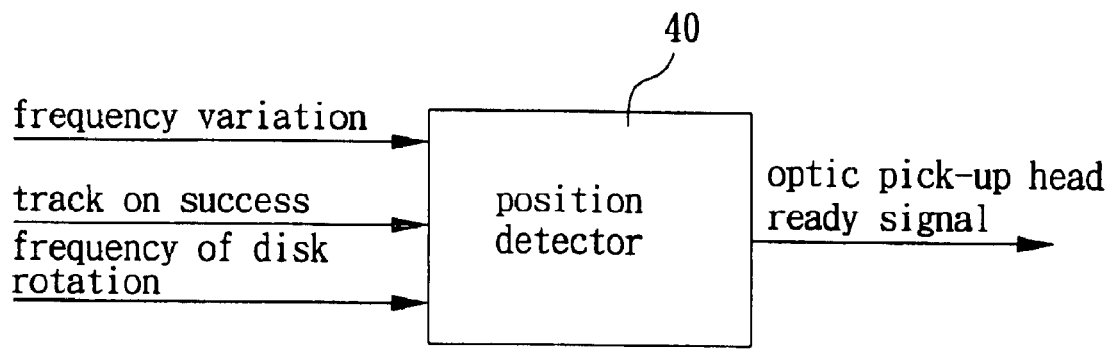
FIG. 4A is a schematic view of a position detector of the present invention.

Referring to FIG. 4A, a position detector 40 in the control circuit for control the reading action of the optic pick-up head in an optic disk drive according to the present invention is illustrated. This position detector 40 serves to detect the position of the optic pick-up head. The position detector 40 receives a frequency variation (FA) of the data phase lock loop, a track on success signal (TOS), and a frequency of disk rotation signal (FODR). After being processed in the position detector 40, a pick-up head ready signal (PUHRDY) is output, then the position of the optic pick-up head on the compact disk is ready to be detected.

The pick-up head ready signal output from the position detector 40 is effective as the track on success signal is reset. Therefore, if the position detector 40 receives a track on success signal and after the signal is processed in the position detector, the output pick-up head ready signal is an ineffective signal in data reading, while the disk rotating frequency received by the position detector 40 along with the frequency variation of the phase lock loop to show the frequency of the phase lock loop unchanged. Furthermore, as the tracking operation is stopped, an effective pick-up head ready signal is output.

Figure 4B:
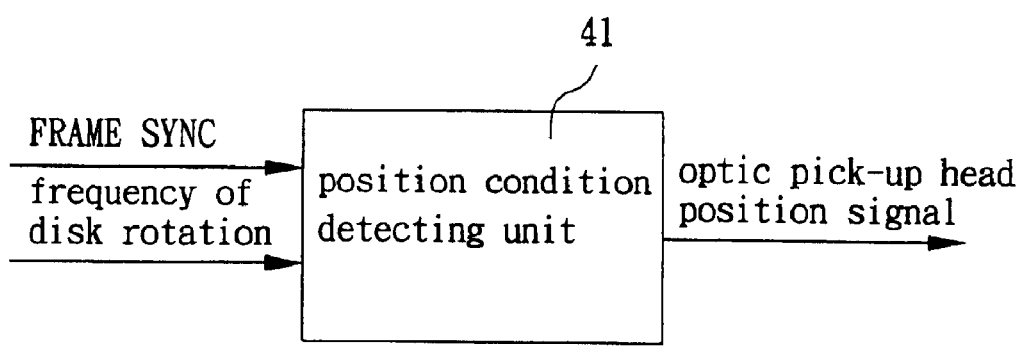
FIG. 4B is a schematic view of a position condition detecting unit of the present invention.

Referring to FIG. 4B, a position condition detecting unit 41 on the control circuit for controlling the optic pick-up head of the optic disk drive to read is illustrated. The position condition-detecting unit 41 receives a FRAMESYNC signal and the FODR signal. After processing in the position condition detecting unit 41, the position signal of the optic pick-up head is output. Furthermore, a pick-up head ready signal along with the output of the position detector 40 is used for determining the position of the optic pick-up head. The position condition detecting unit 41 receives the FRAMESYNC and the FODR signals and then an optic pick-up head position signal is output. Before the position condition detecting unit 41 outputs an effective optic pick-up head position signal, an effective pick-up head ready signal is output from the position detector 40. Otherwise, the optic pick-up head position signal output from the position condition detecting unit 41 is ineffective.

Figure 4C:
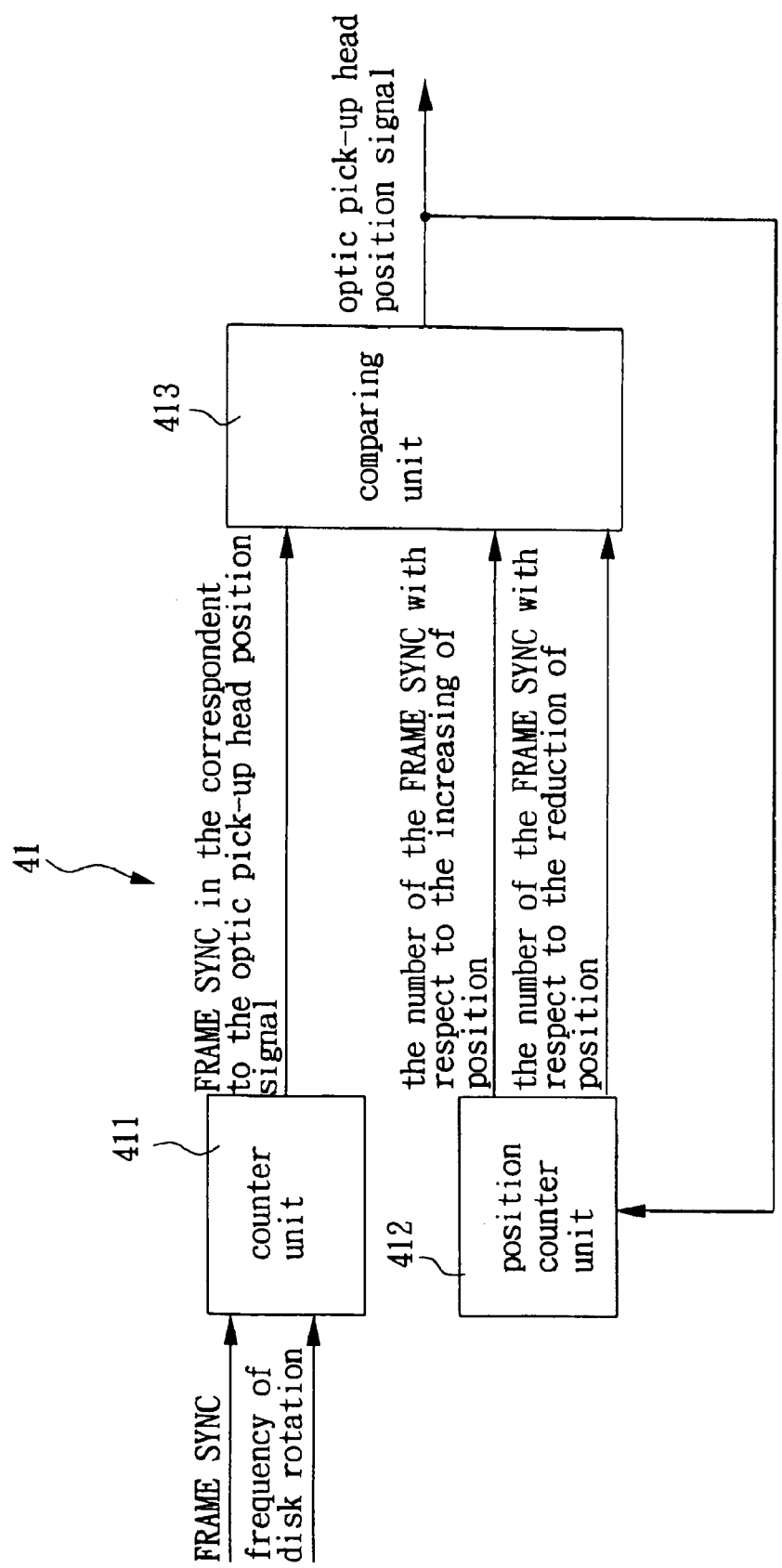
FIG. 4C is a circuit block diagram of the position condition detecting unit.

Referring to FIG. 4C, the inner circuit block diagram of the position condition detecting unit 41 is illustrated. In that, a counting unit 411 receives a FRAMESYNC signal and a FODR signal, then FRAMESYNCs per FODR is counted and output. The FRAMESYNCs per FODR means the number of the FRAMESYNCs as the compact disk rotates one cycle.

The position counting unit 412 receives the optic pick-up head position signal, and then the number of the FRAME-SYNCs in the section is output. Each section has the upper limit and lower limit with respect to the number of the FRAMESYNC. After the position counting unit 412 receives the optic pick-up head position signal, through the relation of the optic pick-up head position with respect to the section, an upper limit and a lower limit of the number of FRAMESYNC signal in the section are output.

The comparing unit 413 receives the FRAMESYNC per FODR and the upper and lower limits of the number of the FRAMESYNCs and then compares for outputting the optic pick-up head position signal. Then the optic pick-up head position signal is fed back to the position counting unit 412. Aforesaid operation is performed cyclically for looking for a correcting optic pick-up head position.

The section about the position of the optic pick-up head is determined by detecting the movement and positioning of the optic pick-up head relative to optic disk and by the setting the sections in the compact disk. As above description, the division about each section is determined by the virtual setting of the data section in the compact disk, and each section has an upper limit and a lower limit. Therefore, the range of each section can be defined obviously.

Referring to FIGS. 4C and 3B, if the FRAMESYNC per FODR and the FRAMESYNC are satisfied to a certain section in FIG. 3B, then the position of the optic pick-up head is determined to be in the section. For example, if the FRAMESYNC per FODR is equal to 122, then the current position of the optic pick-up head is 2 (in second section). Then the upper limit in second section is 97 and the lower limit is 84. Since 122>97>84, namely, the position of the optic pick-up head is not at the second section. Then the position of the optic pick-up head is set at 3, and the following comparing operation is performed.

In the following cycle, the position of the optic pick-up head is set at 3 (at third section). The position counting unit 412 counts the upper limit 106 and the lower limit 93 in the third section. Then, these messages are entered into the comparing unit 413 for comparing. Since 122>103, it is not in the third section. Then the position of the optic pick-up head is set at 4, and the following comparing operation is executed. The process is performed repeated until the position of the optic pick-up head is set at 5. After compared by the comparing unit 413, 122 is between the 124 and 111. Therefore, the optic pick-up head is at the fifth section, and the position of the optic pick-up head is determined.

Figure 5:
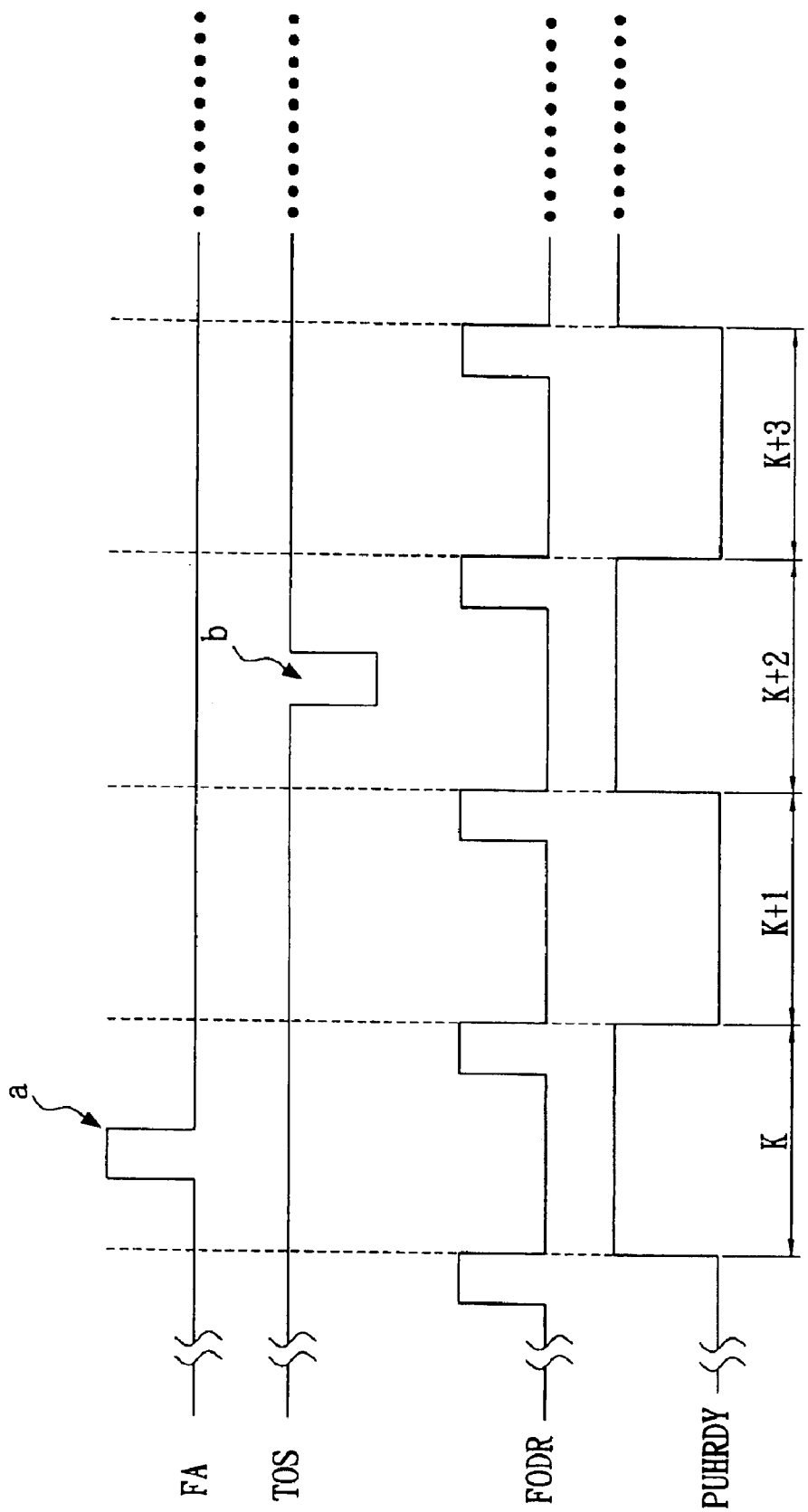
FIG. 5 shows signal waveforms of FIG. 4A.

With reference to FIG. 5, the signal waveforms of FIG. 4A are illustrated. When the frequency variation of the phase lock loop is at 0 (low level), it represents that no change occurs in the frequency of the phase lock loop. While as it is at 1 (high level), it represents that the frequency of the phase lock loop is unsteady. When the track on success (TOS) signal is 1, it represents that the track seeking is successful. If it is 0, the track on succeeding searching is not successful. The FODR represents the frequency of disk rotation. If the pick-up ready (PUHRDY) is 1, it represents the optic pick-up head to be ready in position, while when the pick-up head ready is 0, it represents that a correct position is not found.

The cycle of the PUHRDY is correspondent to that of the FODR, while the condition of the PUHRDY is updated per cycle. The updated result is determined by the conditions of the FA and the TOS. The FA and TOS serve to assert whether the position of the optic pick-up head is ready. If FA is 1 or TOS is 0, it represents that the position of the optic pick-up head is not ready, and therefore, the PUHRDY in next cycle is 0. With reference to FIG. 5, in the k+1 cycle, the PUHRDY is 0 because in the k cycle, the FA is 1. In the k+3 cycle, the PUHRDY is also 0 because in the k+2 cycle, the TOS is 0.

By the aforesaid position detector 40 and the position condition detecting unit 41 and the virtual division of the disk, the position of an optic pick-up head in a compact disk can be found rapidly. In practical applications, the present invention is not confined to the aforesaid division of a disk, namely, the virtual setting of sections in a disk and the related comparing process can be modified according to the capacity of a disk or the structure of the disk so that under a proper control circuit, the user may perform a preferred division so as to achieve the same object.

In the invention the disk can be implemented by, for example, CD, DVD and other optical storage media.

The present invention is thus described; it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device for determining the position of a pick-up head relative to a disk which is divided into a plurality of sections, comprising:

a position detector for receiving a frequency variation (FA), a track on success signal (TOS) and a frequency of disk rotation signal (FODR), and outputting a pick-up head ready signal (PUHRDY);

a position condition detecting unit for receiving a frame synchronous signal (FRAMESYNC) and a frequency of disk rotation signal (FODR), and outputting an optic pick-up head position signal, the position condition detecting unit including:

a counting unit that receives the FRAMESYNC signal and the FODR signal and outputting a FRAME-SYNC per FODR;

a position counting unit that receives a feedback optic pick-up head position signal and outputs an upper limit and a lower limit for the current section;

a comparing unit that receives the FRAMESYNC per FODR, the upper limit, and the lower limit of the current section, and outputs the optic pick-up head position signal.

* * * * *